(12) United States Patent
Izzo

(10) Patent No.: US 12,504,148 B1
(45) Date of Patent: Dec. 23, 2025

(54) CRYSTALLINE OPTICAL DEVICES

(71) Applicant: T. J. Izzo, Evergreen, CO (US)

(72) Inventor: T. J. Izzo, Evergreen, CO (US)

( * ) Notice: Subject to any disclaimer, the term of this patent is extended or adjusted under 35 U.S.C. 154(b) by 0 days.

(21) Appl. No.: 18/788,714

(22) Filed: Jul. 30, 2024

(51) Int. Cl.
*F21V 3/02* (2006.01)
*F21Y 115/10* (2016.01)
*G02B 1/02* (2006.01)

(52) U.S. Cl.
CPC .......... *F21V 3/02* (2013.01); *G02B 1/02* (2013.01); *F21Y 2115/10* (2016.08)

(58) Field of Classification Search
CPC ......... F21V 3/02; F21Y 2115/10; G02B 1/02; A44C 17/001; A44C 17/02
See application file for complete search history.

(56) References Cited

U.S. PATENT DOCUMENTS

| | | | | |
|---|---|---|---|---|
| 6,405,562 B1* | 6/2002 | Zimet | ............... | A44C 17/001 D11/89 |
| 6,833,539 B1* | 12/2004 | Maeda | ............... | A44C 15/0015 63/29.1 |
| 7,033,037 B2* | 4/2006 | Chen | ............... | F21V 5/00 362/104 |
| 9,664,373 B2* | 5/2017 | Zhang | ............... | F21V 14/06 |
| 10,505,078 B2* | 12/2019 | Lee | ............... | H01L 33/60 |
| 11,103,035 B2* | 8/2021 | Disinger | ............... | A44C 5/0007 |
| 2003/0010058 A1* | 1/2003 | Wueste | ............... | A44C 17/001 63/32 |
| 2008/0087042 A1* | 4/2008 | Heimann | ............... | A44C 17/02 63/26 |
| 2009/0056374 A1* | 3/2009 | Abate | ............... | A44C 17/001 63/26 |
| 2015/0009654 A1* | 1/2015 | Chan | ............... | F21V 33/0008 362/104 |
| 2016/0348852 A1* | 12/2016 | Kaandorp | ............... | F21V 13/04 |

FOREIGN PATENT DOCUMENTS

EP      2868421      *   5/2015

* cited by examiner

*Primary Examiner* — Tsion Tumebo
(74) *Attorney, Agent, or Firm* — Kilpatrick Townsend & Stockton LLP

(57) ABSTRACT

An optical device may include a bottom surface having a peripheral edge. The optical device may also include one or more first lateral surfaces extending from the peripheral edge of the bottom surface. Each of the first lateral surfaces may meet the peripheral edge at a first interior angle less than 180°. The optical device may also include one or more second lateral surfaces extending from the one or more first lateral sides. Each of the one or more second lateral surfaces may meet a respective first lateral surface of the one or more first lateral surfaces at a second interior angle of less than 180°. The optical device may also include a top end coupled with the one or more second lateral surfaces.

10 Claims, 10 Drawing Sheets

# CRYSTALLINE OPTICAL DEVICES

BACKGROUND

Diamonds have long been admired for their optical properties. These optical properties led to diamonds being used as gemstones for centuries or longer. Diamonds may be too expensive to be accessible by many. Therefore, optical devices with similar and/or identical optical properties are desired.

BRIEF SUMMARY

An optical device ("device") may include a bottom surface having a peripheral edge. The device may include one or more first lateral surfaces extending from the peripheral edge of the bottom surface, where each of the first lateral surfaces meets the peripheral edge at a first interior angle less than 180°. The device may include one or more second lateral surfaces extending from the one or more first lateral sides, where each of the one or more second lateral surfaces meets a respective first lateral surface of the one or more first lateral surfaces a second interior angle of less than 180°. The device may include a top end coupled with the one or more second lateral surfaces.

In some embodiments, an optical element may be coupled with the bottom surface of the optical device. The optical element may include a light source in contact with the bottom surface of the optical device. The bottom surface may include a concave feature. At least one of the one or more first lateral surfaces and the one or more second lateral surfaces may include a facet. The optical device may include k-9 glass. The optical device may include polycarbonate. A second bottom surface of a second optical device may be in contact with the top surface of the optical device. The optical device may include a material with a refractive index within a range of 2.4 to 1.4, inclusive. The top end of the optical device may be pyramidal. The optical device may include two or more bodies with different refractive indexes, the two or more bodies joined with an optical adhesive.

An optical device may include a first optical body manufactured from a first material may include. The first optical body may include a first base surface, one or more first lateral surfaces extending from the base surface at interior angles of less than 180, and a first end opposite the first base surface. The optical device may include a second optical body manufactured from a second material, and in optical contact with the first optical body. The second optical body may include a second base surface, one or more second lateral surfaces extending from the second base surface at interior angles of less than 180°, and a second end opposite the second base surface.

In some embodiments, the first end may include a first table, and the second base surface may include a second table. The first base surface may include a concave feature. An optical element may be in contact with the concave feature of the first base surface, and a void may be defined between the concave feature and the optical element, where the void is filled with at least one of air, nitrogen, or water. The first material may include a first refractive index, and the second material may include a second refractive index, different than the first refractive index. At least one of the first optical body and the second optical body may be a triamond. At least one of the first material and the second material may include a crystalline material. At least one of the first material and the second material may be colorless.

DETAILED DESCRIPTION

Figure 1:
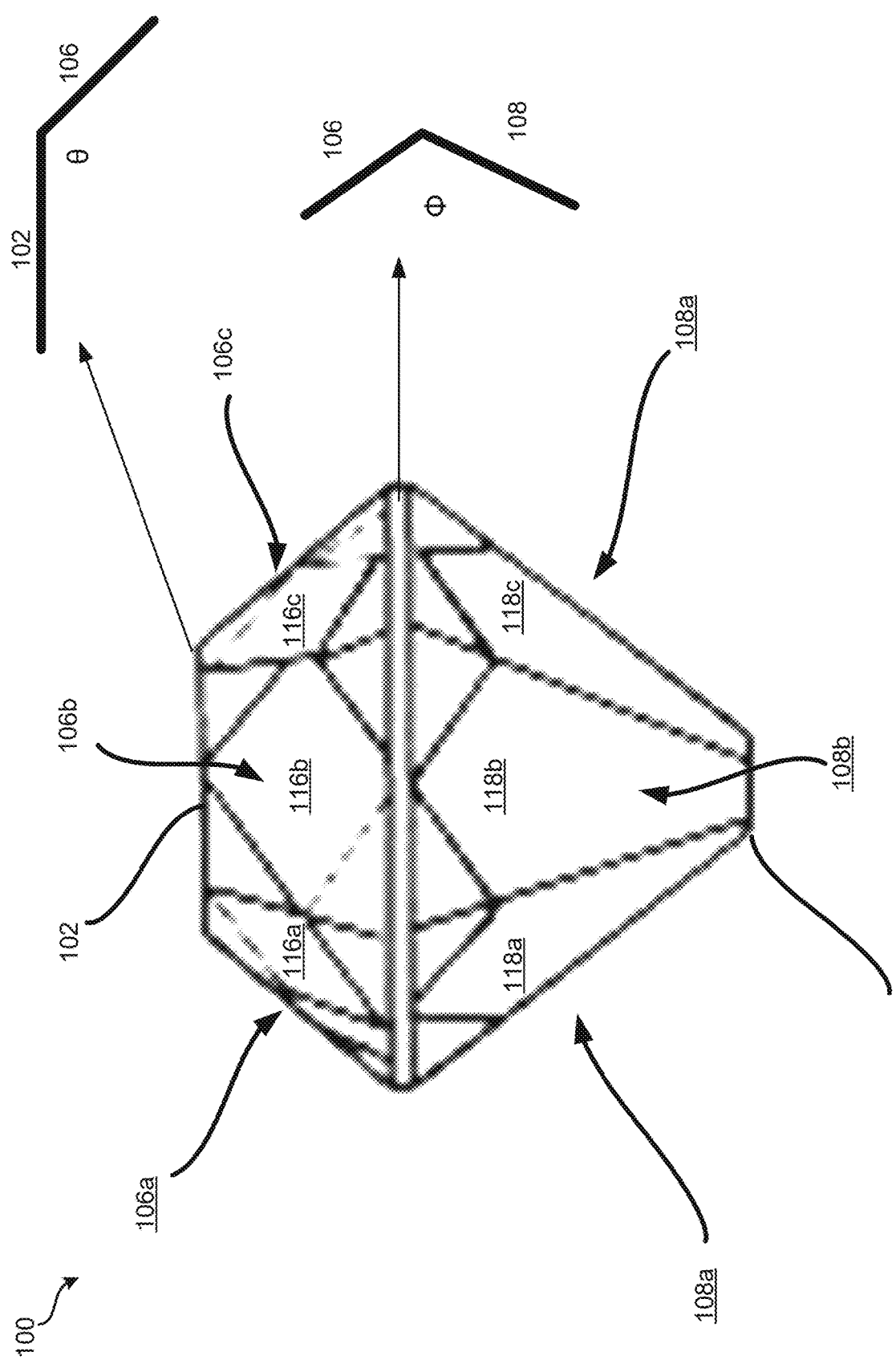
FIG. 1 illustrates a diagram of a diamond for use in an optical device, according to certain embodiments.

Diamonds have long been admired for their optical properties. These optical properties led to diamonds being used as gemstones for centuries or longer. Rough, or uncut diamonds may have the same physical properties as cut diamonds (e.g., hardness, crystalline structure, etc.), but the optical properties may not be fully appreciated until a diamond is cut. Various types of cuts have been developed to enhance certain properties of a diamond. While the cuts may differ from each other in style and presentation, the cuts all exist to take advantage of a diamond's optical properties, such as its refractive index.

A refractive index of a material is a measure of how much light is bent by a material determined by the speed light travels through the material as compared to the speed of light in a vacuum. The higher the refractive index of a material, the more light is bent when it enters the material. Refractive indices of transparent media may vary between about 1.33 (Water) to about 2.65 (Moissonite). The refractive index of diamond (as a material) is 2.42, and thus has a relatively high refractive index.

A consequence of a material's refractive index is total internal reflection (TIF). The potential for TIF within an object may be determined by the object's material (i.e., the material's refractive index). TIF is defined by an angle of incidence (a "critical angle") above which light must be incident on an internal surface of the object in order to exit the material. If light enters an object and then encounters an internal surface at some angle less than the critical angle, some or all of the light may be redirected within the object instead of exiting the object. As applied to diamonds, creating TIF within a diamond adds to its sparkle and brilliance, qualities valued in gemstones.

The cut of diamonds has therefore been traditionally designed to maximize TIF of light that enters the diamond, generating optical effects such as sparkle and brilliance as light reflects off of the internal surfaces several times before exiting the diamond. Traditionally, therefore, a typical diamond cut consists of a relatively large, flat surface to let light into the diamond. Other surfaces and/or facets are cut into the diamond in order to cause TIF for at least a large portion of the light. Facets and/or surfaces near the table of the diamond may serve as eventual exit points for the light, presenting the desired optical effects. These optical effects may generally be reliant on ambient light, however, and thus a typical diamond may be mounted with a table facing upwards to collect as much ambient light as possible. While this configuration may aid in utilizing diamonds as gemstones, other configurations may take advantage of some or all of these effects to achieve different purposes.

One such purpose may be to generate multiple images of an optical element. For example, a diamond may be formed to include a first table and a second table, the second table opposite the first table. Multiple surfaces may be formed into the diamond to form lateral surfaces and/or facets. The first table may then be oriented such that light from an optical element may be directed into the diamond through the first table. The light from the optical element may then be reflected off of some or all of the surfaces (e.g., the first and second table, the lateral surfaces, and/or the facets). The light from the optical element may eventually exit the diamond via the facets and/or the lateral surfaces oriented roughly opposite the first table, and/or the second table. The result may be multiple images of the optical element being visible, as the light from the optical element may exit the diamond from multiple surfaces.

Another configuration may include a first diamond and a second diamond in optical contact with one another. The first diamond may be formed to include a first table and a second table, opposite the first table. The first diamond may also be formed to include multiple lateral surfaces and/or facets. Some of the lateral surfaces and/or facets may be roughly oriented towards the first table, and others may be roughly oriented away from the first table. The second diamond may be formed to include a third table and multiple second lateral surfaces and/or second facets. The third table may be in optical and/or physical contact with the second table, creating a unitary optical device. The first table may be directed towards an optical element such that light from the optical element is directed into the unitary optical device via the first table. The light from the optical element may be internally reflected by of some or all of the lateral surfaces and/or facets, exiting the first diamond via the second table. The light from the optical element may then enter the second diamond via the third table. The light from the optical element may then be internally reflected by some or all of the second lateral surfaces and/or second facets, until exiting the unitary optical device through some of the second lateral surfaces and/or facets.

As described herein, a "diamond" may refer to any object formed to be shaped similarly to a cut natural diamond as described above. A diamond, as used herein may be formed from any crystalline or non-crystalline material. For example, a diamond may be formed from borosilicate glass, K-9 glass, polycarbonate, crown glass, polyethylene, moissanite, or any other suitable material having a refractive index of at least 1.4. In some embodiments, the diamond may be formed from a material with a lower refractive index and include a refractive coating such as tantalum pentoxide (Ta2O5), aluminum oxide (Al2O3), hafnium oxide (HfO2), and/or other suitable coatings. Also, an optical element may include any element capable of directing light into a diamond. For example, an optical element may include an object (e.g., a stone, piece of metal, etc.) chosen to produce a desired image and capable of reflecting light into the diamond. In other examples, an optical element may include a light emitting diode (LED) or other light source, capable of generating light and directing the light into the diamond. One of ordinary skill in the art would recognize many different possibilities and configurations.

FIG. 1 illustrates a diagram of a diamond 100 for use in an optical device, according to certain embodiments. The diamond 100 may include a first table 102, a second table 104, first lateral surfaces 106a-c, second lateral surfaces 108a-c, first facets 116a-c, and second facets 118a-c. A material used to form the diamond 100 may include a refractive index of about 1.4 to about 2.62, inclusive. The material may include any crystalline material (e.g., K-9 glass) and/or a non-crystalline material (e.g., polycarbonate). The diamond 100 may include a height as measured from the first table 102 to the second table 104 within in a range of about 1 cm to about 15 cm. The diamond 100 may also include a widest point of the diamond 100, defining a diameter of the diamond 100. The widest point may be measured from where any two opposite meeting points of lateral surfaces meet (e.g., where the lateral surfaces 106a and 108a meet to where the lateral surfaces 106c and 108c meet). The diameter of the diamond 100 at the widest point may be within a range of about 5 cm to about 18 cm.

The first table 102 may be substantially flat or may include a concave surface. The concave surface may have a depth of less than or about 0.25 cm, less than or about 0.5 cm, less than or about 1 cm, less than or about 2 cm, and/or less than or about 2.5 cm. In some embodiments, the depth of the concave surface may be relative to a dimension of the diamond 100. For example, the depth may be 5% of a diameter of the diamond 100, 10% of a diameter of the first table 102, 15% of a height of the diamond 100 (as measured from the first table 102 to the second table 104), or any other such measurement. One of ordinary skill in the art would recognize many different possibilities and configurations. The table 102 and any other "table" referred to herein may also be referred to as a "base surface." The first table 102 may include a peripheral edge, from which the first lateral surfaces 106a-c extend. The first table 102 may include a diameter (as measured from any two opposite points along the peripheral edge) within a range of about 1 cm to about 14 cm. In some embodiments, the diameter of the first table 102 may be determined as a ratio of the diameter of the first table 102 to the diameter of the diamond 100. For example, the ratio may be 4:5, where if the diameter of the diamond 100 is 10 cm, the diameter of the first table is 8 cm. Other examples may include other ratios, such as 2:3, 1:2, 7:8, etc.

The first lateral surfaces 106a-c may extend from the first table 102 at an interior angle θ. The interior angle θ may be any angle less than 180°. For example, the interior angle θ may be 100°, 110°, 150°, etc. The interior angle θ may be determined based at least in part on the refractive index of the material used to form the diamond 100. For example, the refractive index of the material of the diamond 100 may cause light that enters via the first table 102 to be directed towards one or more of the first lateral surfaces 106a-c. The interior angle θ may be determined such that the angle of incidence of the light from the first table 102 is below the critical angle of the material used to form the diamond 100. Thus, the light from the first table 102 may be internally reflected to other surfaces of the diamond 100.

The first facets 116a-c may be formed on the first lateral surfaces 106a-c, respectively. Although only the first facets 116a-c are shown on the diamond 100, any number of facets may be present on the first lateral surfaces 106a-c. The first facets 116a-c may include a quadrilateral shape, a triangular shape, a hexagonal shape, an octagonal shape, a round shape, or any other suitable shape. In some embodiments, the first facets 116a-c may all be the same shape and size, or may include facets with different shapes and/or sizes. Furthermore, the facets 116a-c may face various directions with respect to a center of the diamond 100. For example, the lateral surface 106a may include the first facet 116a and other facets. The first facet 116a may face a first direction, as measured by a normal extending from the first facet 116a at a first azimuthal angle and a first polar angle. Other facets may face other directions, as measured from respective normals extending from the other facets at different azimuthal angles and polar angles. Like interior angle θ, the azimuthal angles and polar angles of the first facets 116a-c (and any other facets present on each of the first lateral surfaces 106a-c) may be determined at least in part on the refractive index of the material used to form the diamond 100. In other words, the first facets 116a-c may be configured to internally reflect the light entering the first table 102.

Although only three lateral surfaces 106a-c are shown in FIG. 1, the diamond 100 may include any number of lateral surfaces. As illustrated, the diamond 100 may include six lateral surfaces (e.g., including three more lateral surfaces, each opposite a respective surface of the lateral surfaces 106a-c). In other embodiments, the diamond 100 may include three lateral surfaces, four lateral surfaces, five lateral surfaces, eight lateral surfaces, etc. Furthermore, the size and angle of each of the lateral surfaces may be identical or may vary in corresponding pairs. In other embodiments, each of the lateral surfaces may include a different size and angle.

The second lateral surfaces 108a-c may meet the first lateral surfaces 106a-c at an interior angle Φ. The interior angle Φ may be any angle less than 180°. For example, the interior angle Φ may be 90°, 110°, 150°, etc. The interior angle Φ may be determined based at least in part on the refractive index of the material used to form the diamond 100. For example, the refractive index of the material of the diamond 100 may cause light that enters via the first table 102 to be directed towards one or more of the second lateral surfaces 108a-c. The interior angle Φ may be determined such that the angle of incidence of the light from the first table 102 is below the critical angle of the material used to form the diamond 100. Thus, the light from the first table 102 may be internally reflected to other surfaces of the diamond 100.

The second facets 118a-c may be formed on the second lateral surfaces 108a-c, respectively. Although only the second facets 118a-c are shown on the diamond 100, any number of facets may be present on the second lateral surfaces 108a-c. The second facets 118a-c may include a quadrilateral shape, a triangular shape, a hexagonal shape, an octagonal shape, a round shape, or any other suitable shape. In some embodiments, the second facets 118a-c may all be the same shape and size, or may include facets with different shapes and/or sizes. Furthermore, the second facets 118a-c may face various directions with respect to a center of the diamond 100. For example, the lateral surface 108a may include the second facet 118a and other facets. The second facet 118a may face a second direction, as measured by a normal extending from the second facet 118a at a second azimuthal angle and a second polar angle. Other facets may face other directions, as measured from respective normals extending from the other facets at different azimuthal angles and polar angles. Like interior angle θ, the azimuthal angles and polar angles of the second facets 118a-c (and any other facets present on each of the second surfaces 108a-c) may be determined at least in part on the refractive index of the material used to form the diamond 100. In other words, the second facets 118a-c may be configured to internally reflect the light entering the first table 102.

The second table 104 may be substantially flat or may include a concave surface. The first table 104 may include a second peripheral edge, from which the second lateral surfaces 108a-c extend. The first table 104 may include a diameter (as measured from any two opposite points along the peripheral edge) within a range of about 0.5 cm to about 14 cm. In some embodiments, the diameter of the first table 102 and the diameter of the second table 104 may be equal. In some embodiments, the diameter of the second table 104 determined as a ratio of the diameter of the first table 102 to the diameter of the second table 104. For example, ratio may be 2:1, where if the diameter of the first table 102 is 4 cm, the diameter of the second table is 2 cm. Other examples may include other ratios, such as 1:1, 3:1, etc. In some embodiments, the diameter of the second table 104 may be determined as a ratio of the diameter of the second table 104 to the diameter of the diamond 100. For example, the ratio may be 2:5, where if the diameter of the diamond 100 is 10 cm, the diameter of the first table is 4 cm. Other examples may include other ratios, such as 2:3, 1:2, 7:8, etc.

In some embodiments, the diamond 100 may not include the second table 104. Instead, the second lateral surfaces 108a-c may meet at a vertex. Thus, the diamond 100 may include an end, with a point or other such shape. The end may be angular or rounded. In some embodiments, the first lateral surfaces 106a-c and/or the second lateral surfaces 108a-c may be replaced with a single, rounded lateral surface. One of ordinary skill in the art would recognize many different possibilities and configurations.

Figure 2:
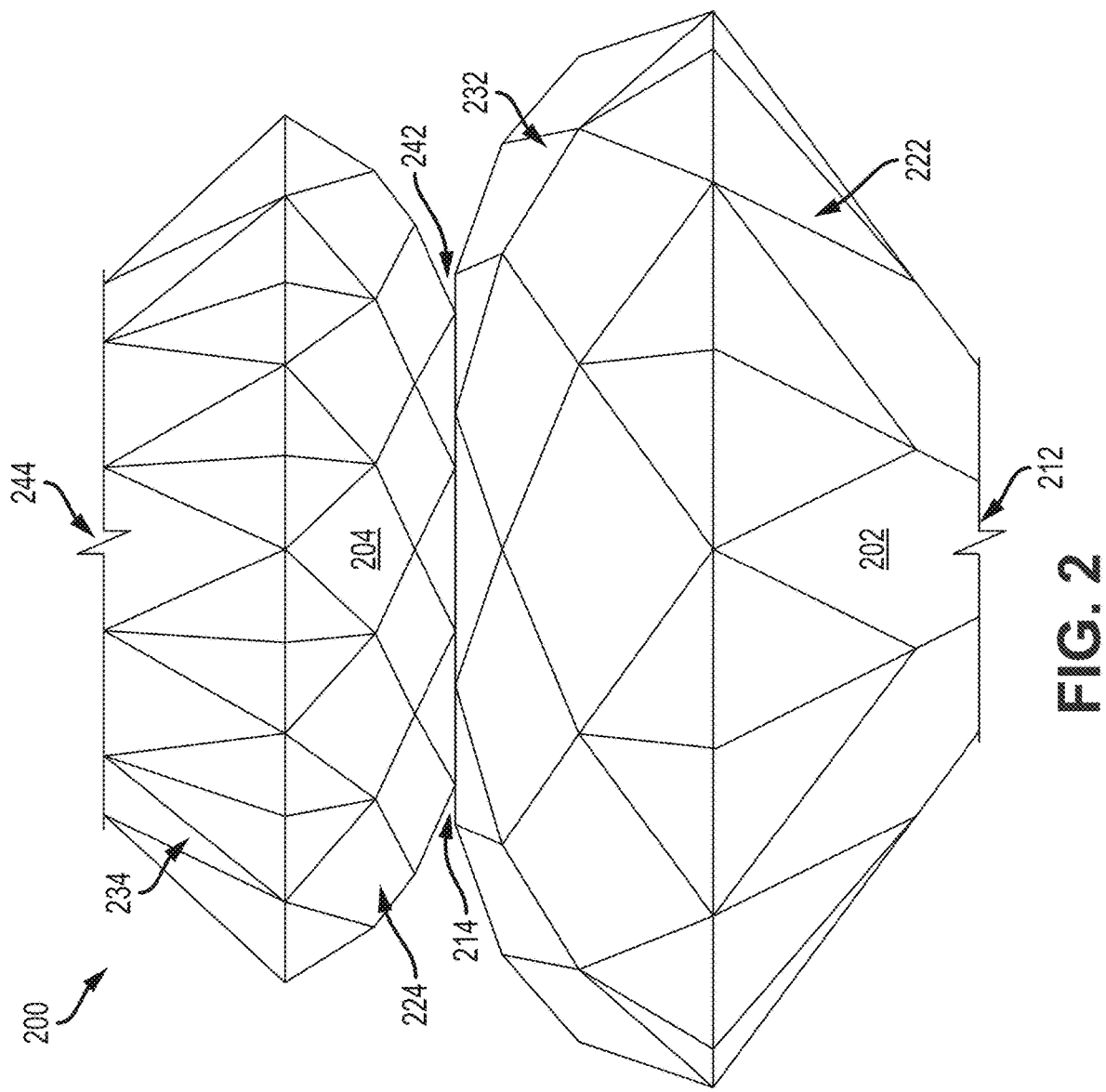
FIG. 2 illustrates an optical device including a first diamond and a second diamond, according to certain embodiments.

FIG. 2 illustrates an optical device including a first diamond 202 and a second diamond 204, according to certain embodiments. The first diamond 202 may be similar to the diamond 100 in FIG. 1 and include a first table 212, a first lateral surface 222, a second lateral surface 232, and a first end 242. The first table 212 may be similar to the first table 102 described in FIG. 1, and have similar features and functions. The first lateral surface 222 (and any other first lateral surfaces) may be similar to the first lateral surfaces 106a-c and include similar features and functionalities. The first lateral surface 222 may be one of any number of first lateral surfaces. For example, the first diamond 202 may include 3 first surfaces, 4 first surfaces, 5 first surfaces, 10 first surfaces, etc. For example, the first lateral surface 222 may include any number of first facets configured to internally reflect light from the first table 212 and/or other surfaces of the first diamond 202. The second lateral surface 232 may be similar to the second lateral surfaces 108a-c in FIG. 1 and include similar features and functionalities. The second lateral surface 232 may include any number of second facets configured to internally reflect light from the first table 212 and/or other surfaces of the first diamond 202.

In some embodiments, the first end 242 may include an vertex, where the second lateral surface(s) 232 meet. In other embodiments, as shown in FIG. 2, the first end 242 may include a table, such as the second table 104 in FIG. 1. The first end 242 may then be the same size as the first table 212 or may be larger in diameter than the first table 212 (as shown in FIG. 2). In some embodiments, the first end 242 may be smaller than the first table 212. The first end 242 may be substantially flat (or planar) or may be concave or convex. The first end 242 may be configured to direct light reflected from the first lateral surface 222 (and any other first lateral surfaces) and/or any other surfaces of the first diamond 202 to the second diamond 204. The first end 242 may be connected to a second table 214 of the second diamond 204. The first end 242 and the second table 214 may be connected physically and optically, as shown in FIG. 2, or may be just optically connected (e.g., separated by a gap). In some embodiments, the first diamond 202 and the second diamond 204 may be bonded or otherwise connected via an optical adhesive, glue, mechanical fastener (e.g., a screw, bolt, pin, etc.) and/or any other suitable means. In all embodiments, the first end 242 and second table 214 may be connected such that some or all of light from the first diamond 202 may pass into the second diamond 204 and vice a versa.

The second table 214 may include the same diameter as the first end 242, or may be smaller or larger than the first end 242. In some embodiments, the diameter of the second table 214 may be determined by a ratio of the first end 242. For example, the ratio may be 2:3 where if the diameter of the first end 242 is 6 cm, the diameter of the second table 214 is 4 cm. Other ratios may include 1:1, 3:4, 6:7, etc.

The second diamond 204 may include a third lateral surface 224. The third lateral surface 224 may be similar to the first lateral surfaces 106a-c in FIG. 1. The third lateral surface 224 may be one of any number of first lateral surfaces included in the second diamond 204 (e.g., 3 surfaces, 5 surfaces, etc.). In some embodiments, the third lateral surface 224 (and other third lateral surfaces) may correspond to the first lateral surface(s) 222 and/or the second lateral surface(s) 232. For example, the first lateral surface(s) 222, the second lateral surface(s) 232, and the third lateral surface(s) 224 may all include the same number of surfaces, corresponding facets, corresponding shapes (e.g., triangular, quadrilateral, etc.), and other such features. In other embodiments, the third lateral surface(s) 224 may correspond to one or the other of the first lateral surface(s) 222 and the second lateral surface(s) 232.

The second diamond 204 may also include a fourth lateral surface 234. The fourth lateral surface 234 may be similar to the second lateral surfaces 108a-c in FIG. 1 and/or the second lateral surface 224. The fourth lateral surface 234 may be one of any number of fourth lateral surfaces (e.g., 3 fourth lateral surfaces, 5 fourth lateral surfaces, etc.). The fourth lateral surface(s) 234 may correspond to some or all of the first lateral surface(s) 222, the second lateral surface(s) 232, and/or the third lateral surface(s) 224.

The second diamond 204 may also include a second end 244, opposite the second table 214. The second end 244 may include a fourth table, as is shown in FIG. 2, or may include an vertex where the fourth lateral surface(s) 234 meet. In embodiments where the second end 244 includes the fourth table, the second end 244 may include a diameter equal to the diameter of the first end 242. Alternatively, the second end 244 may include a diameter determined by a ratio of the diameter of the second end 244 to the second table 214. For example, the ratio may be 2:3 where if the diameter of the second table 214 is 6 cm, the diameter of the second end 244 is 4 cm. Other ratios may include 1:1, 3:4, 6:7, etc.

The second table 214 may be configured to receive light from the first diamond 202 via the first end 242. For example, the light from the first diamond 202 may enter the first diamond 202 via the first table 212. The light may enter the first diamond 202 from an optical device (e.g., an object such as a metal or stone, and/or a light source such as an LED). The light from the optical device may be internally reflected by one or more surfaces of the first diamond 202 (e.g., the first lateral surface 222, second lateral surface 232, etc.) and exit the first diamond 202 via the first end 242. The light may then enter second diamond 204 via the second table 214. The light may then be internally reflected by one or more surfaces of the second diamond 204 (e.g., the third lateral(s) 224 and/or the fourth lateral surfaces(s) 234) and exit the second diamond 204 via the second end 244 and/or the fourth lateral surfaces(s) 234.

In some embodiments, the first diamond 202 and the second diamond 204 may be formed from the same material (e.g., K-9 glass, polycarbonate, etc.). In other embodiments, the first diamond 202 may be formed from a first material, and the second diamond 204 may be formed from a second material. The first material may include a first refractive index and the second material may include a second refractive index, which may be the same or different in various embodiments. The first and second refractive indices may be configured to enable internal reflection in one or both of the first diamond 202 and the second diamond 204. In some embodiments, at least one of the first diamond 202 and the second diamond 204 may include a refractive coating to alter the refractive index of the material(s). Furthermore, as shown in FIG. 2, one or both of the first diamond 202 and the second diamond 204 may include be colorless and/or include a color (e.g., a tint in the material, external coating, etc.).

Figure 3:
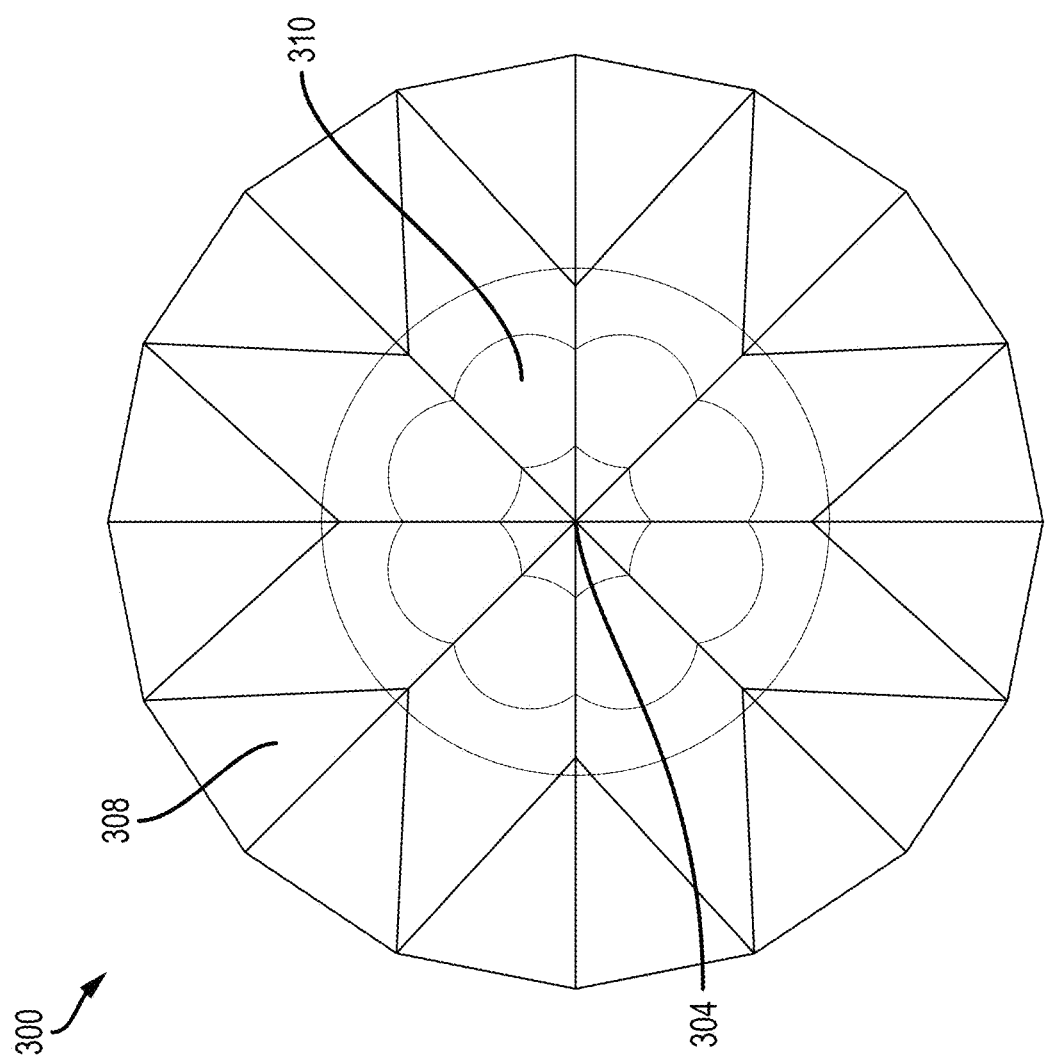
FIG. 3 illustrates an optical device with a diamond and an optical element, according to certain embodiments.

FIG. 3 illustrates an optical device 300 with a diamond 302 and an optical element 310, according to certain embodiments. The diamond 302 may be similar to the diamond 100 in FIG. 1 and include similar features and functionalities. The diamond 302 may include a base surface. The base surface may be a table, such as the first table 102 in FIG. 1, which may be planar, concave, or convex in various embodiments. The base surface may be disposed over the optical element 310. For example, if the base surface is a table, the optical element 310 may be supported by a stand or other such apparatus. The diamond 302 may then be placed directly on the optical element 310 such that the optical element is visible through the diamond 302, or may be supported by the stand or other apparatus. In another example, the base surface may include a concave feature. The diamond 302 may be supported by the stand or other apparatus, such that a void is defined by the concave feature and the stand or other apparatus. The optical element 310 may be disposed within the void such that the optical element 310 is visible through the diamond 302. In some embodiments, the void may be filled with a fluid such as air, water, nitrogen, or other such fluid.

The diamond 302 may include a lateral surface 308. The lateral surface 308 may be similar to the second lateral surface 234 in FIG. 2. As such, the lateral surface 308 may be one of any number of lateral surfaces of the diamond 302. The lateral surface(s) 308 may terminate in an end 304 of the diamond 302. The end 304 may be an vertex, as is shown in FIG. 3, or may include a second table (e.g., the second table 104 in FIG. 1). As light enters the diamond 302 from the base surface, the light may be internally reflected by one or more surfaces of the diamond 302 (e.g., the lateral surface 308). The light may then exit the diamond 302 via the end 304. In the embodiment illustrated in FIG. 3, multiple images of the optical element 310 may be visible via the lateral surface(s) 308 (e.g., facets). In other embodiments, the end 304 may include a second table. The optical element 310 may then be visible via the second table, appearing larger than the optical element.

Figure 4:
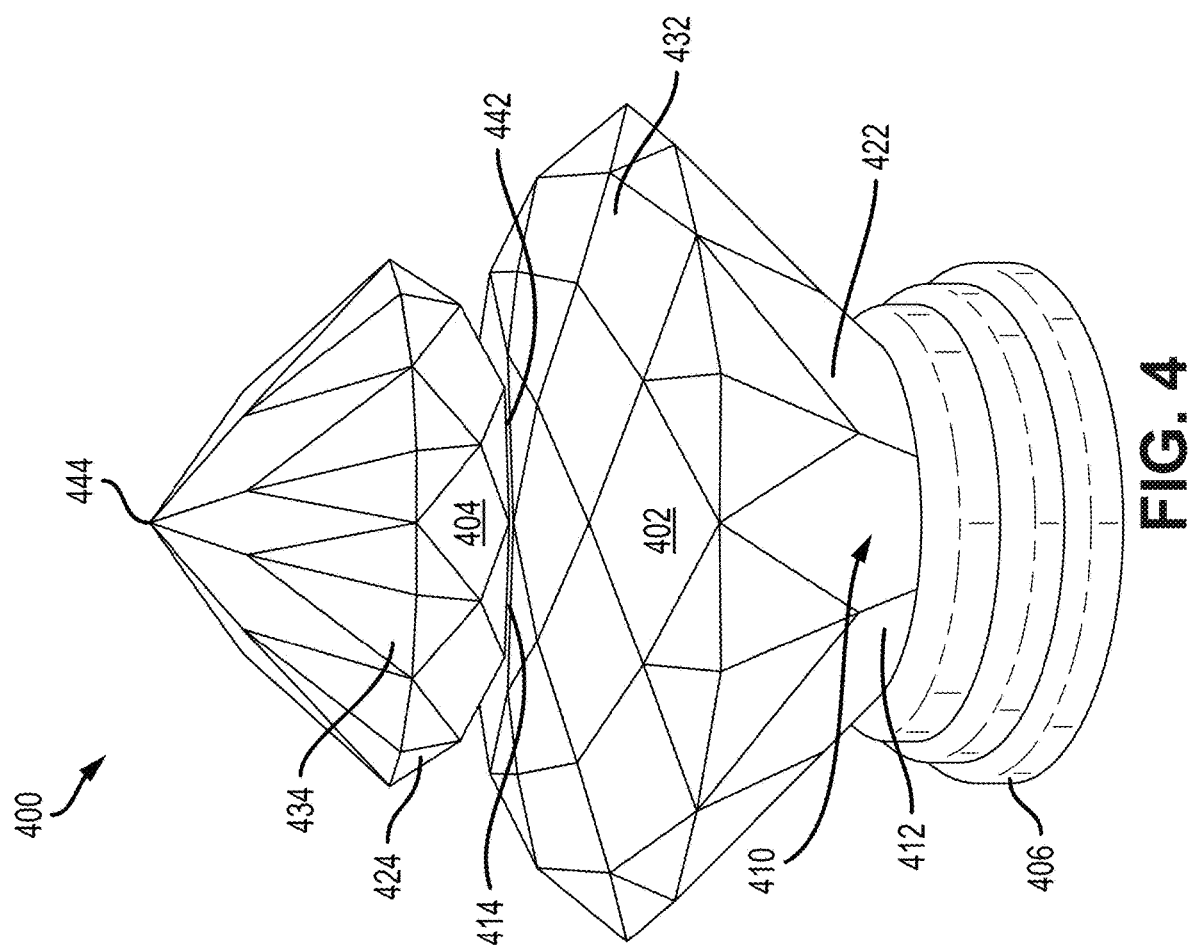
FIG. 4 illustrates an optical device including a first optical body and a second optical body, according to certain embodiments.

FIG. 4 illustrates an optical device 400 including a first optical body 402 and a second optical body 404, according to certain embodiments. The optical device 400 may be a unitary device, where all components are attached. Alternatively, some or all of the components of the optical device 400 may be independent of other components and arranged to form the optical device 400. The optical device 400 may include the first optical body 402, the second optical body 404, and an optical element 406. The first optical body 402 may be similar to the first diamond 202 in FIG. 2. As such, the first optical body 402 may include a base surface 412, a first lateral surface(s) 422, a second lateral surface(s) 432, and a first end 442. Similarly, the second optical body 404 may be similar to the second diamond 204 in FIG. 2, and include a second base surface 414, a third lateral surface(s) 424, a fourth lateral surface(s) 434, and a second end 444.

The optical element 406 may be or may include a base configured to support at least the first optical body 402. The optical element 406 may also include an optical object 410, disposed beneath the first optical body 402. The optical object 410 may include a metal, a stone, a printed image, a light source (e.g., an LED), a mirror, or any other such object. For example, the optical object 410 may be a device configured to reflect light of a certain frequency, providing color (or the appearance thereof) to one or more of the first optical body 402 and the second optical body 404. In another example, the optical object 410 may additionally or alternatively be an object(s) selected to produce a desired image. Light may be reflected or emitted from the object such that the image is visible through one or more surfaces of the first optical body 402 and/or the second optical body 404. In yet another example, the optical object 410 may emit light along one or more axes that align with at least a portion of the base surface 412.

In some embodiments the base surface 412 may include a table (e.g., the first table 102 in FIG. 1). Then, the base surface 412 may be physically and optically connected to at least a portion of the optical element 406. In other embodiments, the base surface 412 may include a concave feature. Then, the concave feature of the base surface 412 and the optical element 406 may define a void. The optical object 410 may then be at least partially disposed within the void.

The second table 414 may be configured to receive light from the first optical body 402 via the first end 442. For example, the light from the first optical body 402 may enter the first optical body 402 via the base surface 412. The light may enter the first optical body 402 from the optical element 406 and/or the optical object 410 (e.g., an object such as a metal or stone, and/or a light source such as an LED). The light from the optical device may be internally reflected by one or more surfaces of the first optical body 402 (e.g., the first lateral surface(s) 422, second lateral surface(s) 432, etc.) and exit the first optical body 402 via the first end 442. The light may then enter second optical body 404 via the second table 414. The light may then be internally reflected by one or more surfaces of the second optical body 404 (e.g., the third lateral(s) 424 and/or the fourth lateral surfaces(s) 434) and exit the second optical body 404 via the second end 444 and/or the fourth lateral surfaces(s) 434.

In some embodiments, ambient light may enter the first optical body 402 via at least a portion the first end 442 (e.g., a portion of the first end 442 extending beyond the second table 414). The ambient light reflected by one or more surfaces of the first optical body 402 (e.g., the first lateral surface(s) 422, second lateral surface(s) 432, etc.) and exit the first optical body 402 via the first end 442. The ambient light may then enter second optical body 404 via the second table 414. The ambient light may then be internally reflected by one or more surfaces of the second optical body 404 (e.g., the third lateral(s) 424 and/or the fourth lateral surfaces(s) 434) and exit the second optical body 404 via the second end 444 and/or the fourth lateral surfaces(s) 434.

Figure 5A:
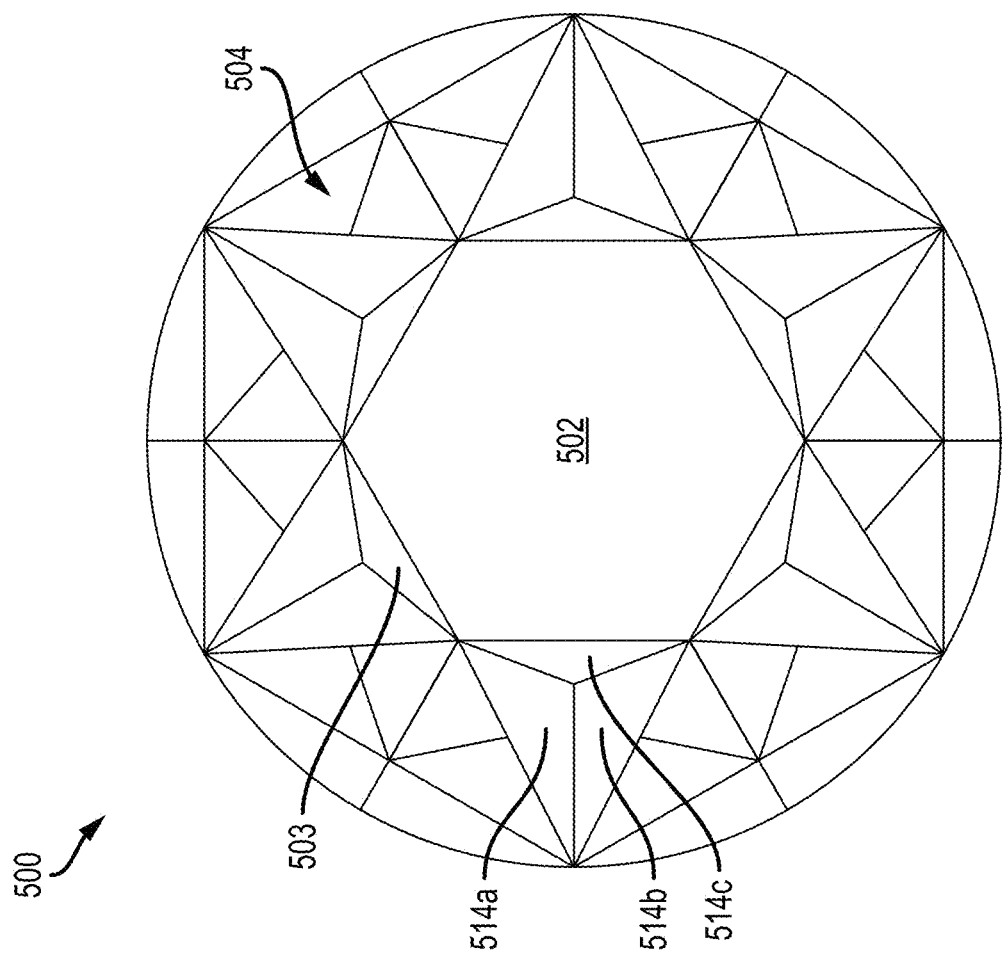
FIGS. 5A-5C illustrates a top down view of a diamond in a triamond configuration, according to certain embodiments.

FIG. 5A illustrates a top down view of a diamond 500 in a triamond configuration, according to certain embodiments. The diamond 500 may be a component of an optical device such as the optical device 300 in FIG. 3 and/or the optical device 400 in FIG. 4. Thus, the diamond 500 may be optically and/or physically attached to an optical element such as a base, an optical object (e.g., a piece of metal, stone, etc.), and/or a light source (e.g., an LED). The diamond 500 may be similar to the diamond 100 in FIG. 1, and include other surfaces not visible in the top down view.

The diamond 500 may include a base surface 502, a lateral surface 504, and facets 514a-c. The base surface 502 may be similar to the first base surface 102 and/or the second base surface 104 in FIG. 1. In the embodiment shown in FIG. 5, the base surface 502 may be hexagonal, including an edge 503 with 6 sides. The base surface 502 may be uniform, such that each of the 6 sides of the edge 503 are the same length. Thus, a width of the base surface 502 may be consistent when measured between any opposite points. For example, the width of the base surface 502 may be within a range of about 1 cm to about 14 cm, inclusive. The base surface 502 may be substantially flat. In some embodiments, the base surface 502 may be concave. For example, as in the optical device 300, the base surface 502 may be in contact (optically and/or physically) with an optical element. The concavity of the base surface 502 may thereby define a void. The optical object may then be disposed in the void. The void may be at least partially filled with air, nitrogen, water, or any other suitable fluid. In other embodiments, the base surface 502 may include a convex feature convex. Light may enter the diamond from a surface opposite the base surface 502 (not shown). After being internally reflected by the diamond 500, the light may exit the base surface 502 via the convex feature, producing a desired image. One of ordinary skill in the art would recognize many different possibilities and configurations.

The lateral surface 504 may be similar to the first lateral surfaces 106a-c in FIG. 1. Thus, with respect to FIG. 1, the lateral surface 504 may extend (into the page as illustrated) from the base surface 502 at an interior angle θ. The interior angle θ may be any angle less than 180°. For example, the interior angle θ may be 100°, 110°, 150°, etc. The interior angle θ may be determined based at least in part on the refractive index of the material used to form the diamond 500.

The lateral surface 504 may include the facets 514a-c. The facets 514a-c may be triangular (e.g., equilateral, isosceles, and/or scalene). In fact, a shape of some or all of the surfaces of the diamond 500 may be triangular Thus, the diamond 500 may be a triamond (i.e., composed of triangles). Although only the facets 514a-c are labelled, it should be understood that the diamond 500 may include any number of facets 514a-c on any number of surfaces of the diamond 500. The facets 514a-c may include equal dimensions, proportional dimensions, and/or different dimensions. The facets 514a-c may also vary in orientation (similar to the facets 116a-c in FIG. 1). For example, the facets 514a-c may face various directions with respect to a center of the diamond 500. The first facet 514a may face a first direction, as measured by a normal extending from the first facet 514a at a first azimuthal angle and a first polar angle. Other facets (e.g., the facets 514b-c) may face other directions, as measured from respective normals extending from the other facets at different azimuthal angles and polar angles.

As the facets 514a-c may vary in orientation, the facets 514a-c may form a pyramid protruding from the diamond 500. In other embodiments, the facets 514a-c may extend inwards, towards the center of the diamond 500 (e.g., a convex feature). One of ordinary skill in the art would recognize many different possibilities and configurations.

Figure 5B:
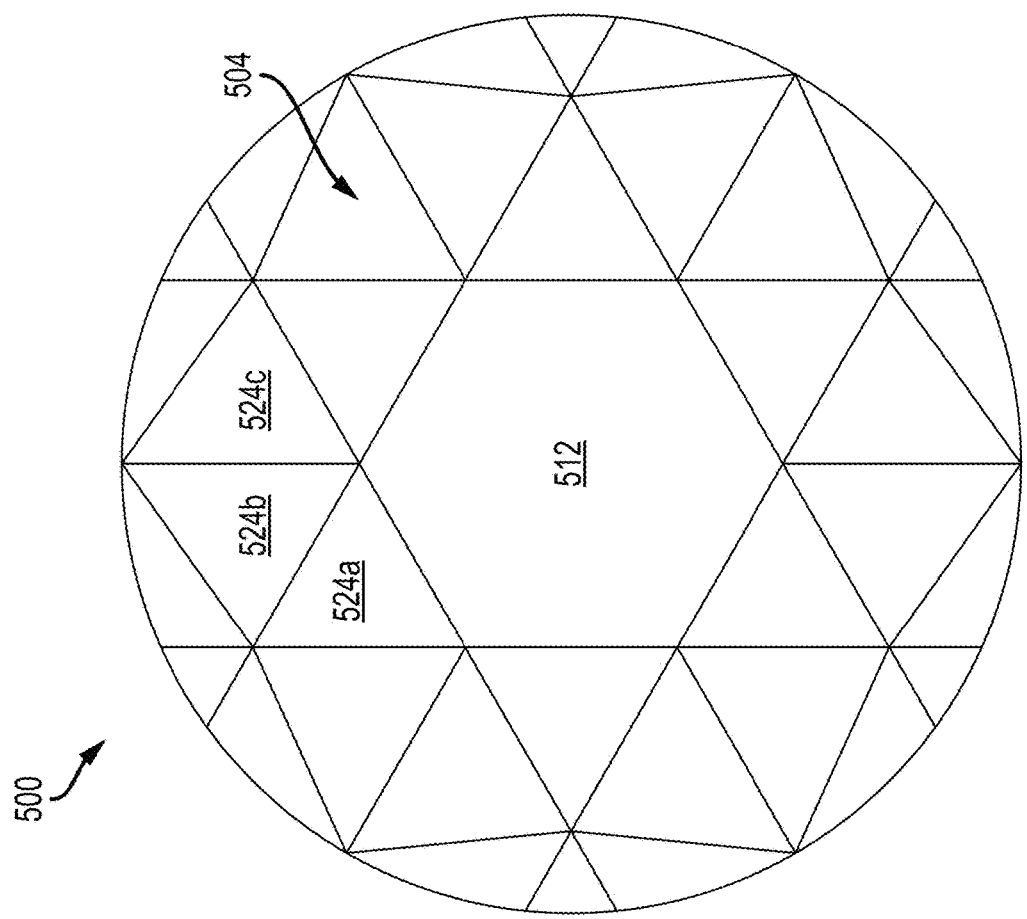

FIG. 5B illustrates a top down view of the diamond 500 in a triamond configuration, according to certain embodiments. As shown in FIG. 5B, the diamond 500 may include a hexagonal base surface 512 similar to the base surface 502 in FIG. 5A. As shown in FIG. 5B, the lateral surface 504 may include facets 524*a-c*. The facets 524*a-c* may be equilateral triangles, arranged about the hexagonal base surface 512. The facets 524*a-c* may be similar to some or all of the facets 514*a-c* in FIG. 5A and include similar properties and functionalities.

Figure 5C:
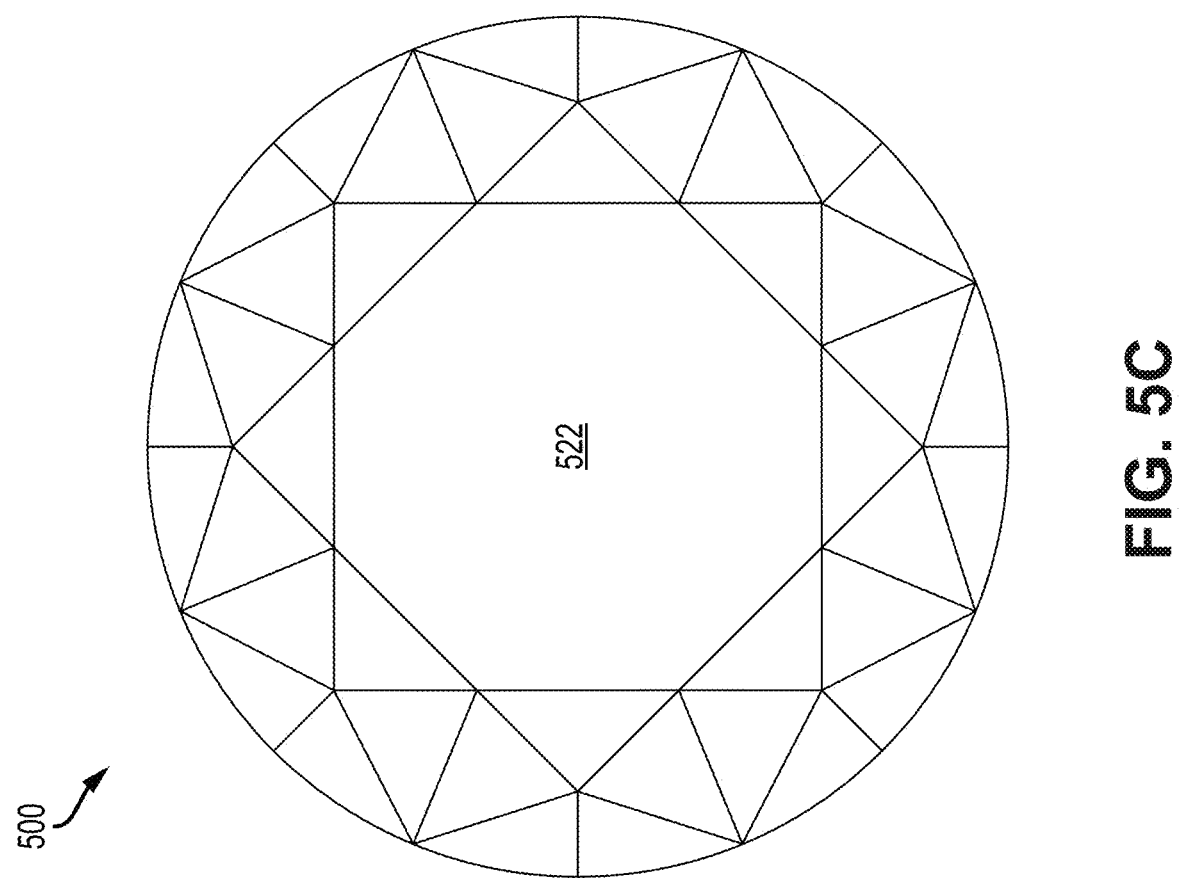

FIG. 5C illustrates a top down view of the diamond 500 in a triamond configuration, according to certain embodiments. As shown in FIG. 5C, the diamond 500 may include an octagonal base surface 522. The octagonal base surface 522 may be substantially flat, include a concave feature, and/or include a convex feature, similar to the base surface 502 in FIG. 5A. As shown in FIG. 5C, the diamond 500 may include facets similar to the facets 514*a-c* and/or the facets 524*a-c*, in FIGS. 5B and 5C, respectively.

Figure 6A:
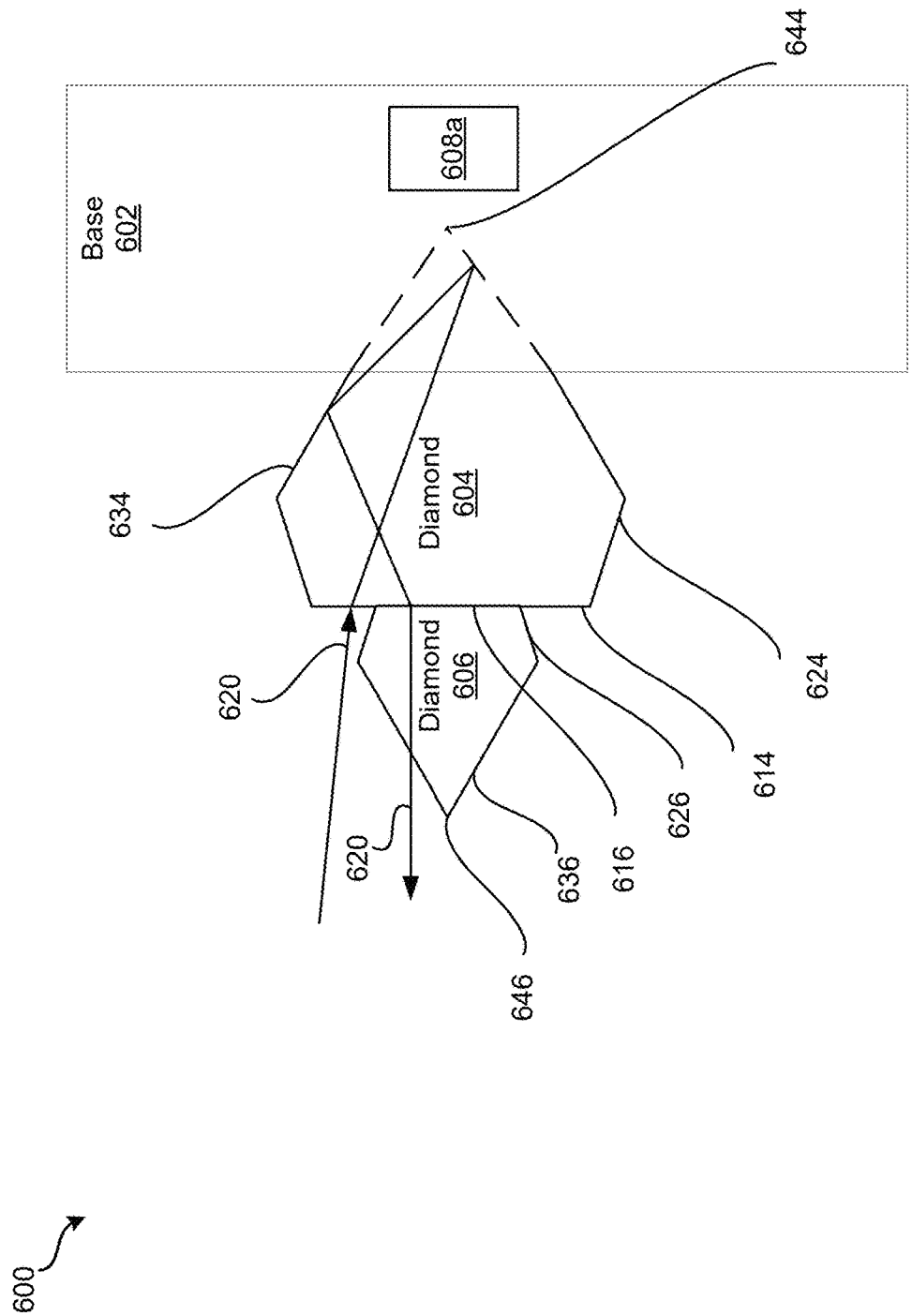
FIG. 6A illustrates an optical device for ambient light with a first diamond and a second diamond, according to certain embodiments.

FIG. 6A illustrates an optical device 600 for ambient light 620 with a first diamond 604 and a second diamond 606, according to certain embodiments. The optical device 600 may include a base 602, the first diamond 604, the second diamond 606, and an optical element 608*a*. The base 602 may be a stand configured to support the first diamond 604 and/or the second diamond 606, a frame, a holder, or any other suitable device. For example, the base 602 may be a frame surrounding a picture, mirror, etc. The base 602 may include wood, plastic, metal, or any other suitable material.

The first diamond 604 may include a first table 614, a first lateral surface(s) 624, a second lateral surface(s) 634, and a vertex 644. The first table 614 may be similar to the first table 102 in FIG. 1, and may include similar properties and functionalities. Similarly, the first lateral surface(s) 624 and second lateral surface(s) 626 may be similar to the first lateral surfaces 106*a-c* and second lateral surfaces 108*a-c*, respectively. The vertex 644 may be defined by a point where the second lateral surface(s) 626 meet. The vertex 644 may be embedded within the base 602, as shown by the dashed lines in FIG. 6A. The first diamond 604 may be secured within the base 602 using an adhesive, mechanical fastener, pressure, or any other suitable method.

The second diamond 606 may include a third table 616, a third lateral surface(s) 626, a fourth lateral surface(s) 636, and a second vertex 646. The vertex 644 may be defined by a point where the second lateral surface(s) 626 meet. The second table 616 may be connected to the first table 614 of the first diamond 606. The first table 614 and the second table 616 may be connected physically and optically or may be just optically connected (e.g., separated by a gap). In some embodiments, the first diamond 604 and the second diamond 606 may be bonded or otherwise connected via an optical adhesive, glue, mechanical fastener (e.g., a screw, bolt, pin, etc.) and/or any other suitable means. In all embodiments, the first table 614 and second table 616 may be connected such that some or all of light from the first diamond 604 may pass into the second diamond 606 and vice a versa. The second table 616 may include the same diameter as the first table 614, or may be smaller or larger than the first table 614. In some embodiments, the diameter of the second table 616 may be determined by a ratio of the first table 614. For example, the ratio may be 2:3 where if the diameter of the first table 614 is 6 cm, the diameter of the second table 616 is 4 cm. Other ratios may include 1:1, 3:4, 6:7, etc.

The optical element 608*a* may be a reflective device, light emitter (e.g., and LED light), or other object configured to create or modify a desired image. For example, the optical element 608*a* may reflect light of a certain color. Because of the optical element 608*a*, the first diamond 604 and/or the second diamond 606 may appear to include the certain color.

Ambient light 620 may enter the first diamond 604 via the first table 614. The ambient light 620 may be internally reflected by one or more surfaces of the first diamond 604 (e.g., the first lateral surface(s) 624, second lateral surface(s) 634, etc.). In some embodiments, the ambient light 620 may exit the first diamond 604 via the vertex 644 and be reflected by the optical element 608*a*. The ambient light 620 may then be redirected into the first diamond 604 via the second lateral surface(s) 626 and exit the first diamond 604 via the first table 614. The ambient light 620 may then enter the second diamond 606 via the second table 616. The ambient light 620 may then be internally reflected by one or more surfaces of the second diamond 606 (e.g., the third lateral(s) 626 and/or the fourth lateral surfaces(s) 636) and exit the second optical body 404 via the second vertex 646 and/or the fourth lateral surfaces(s) 636.

Figure 6B:
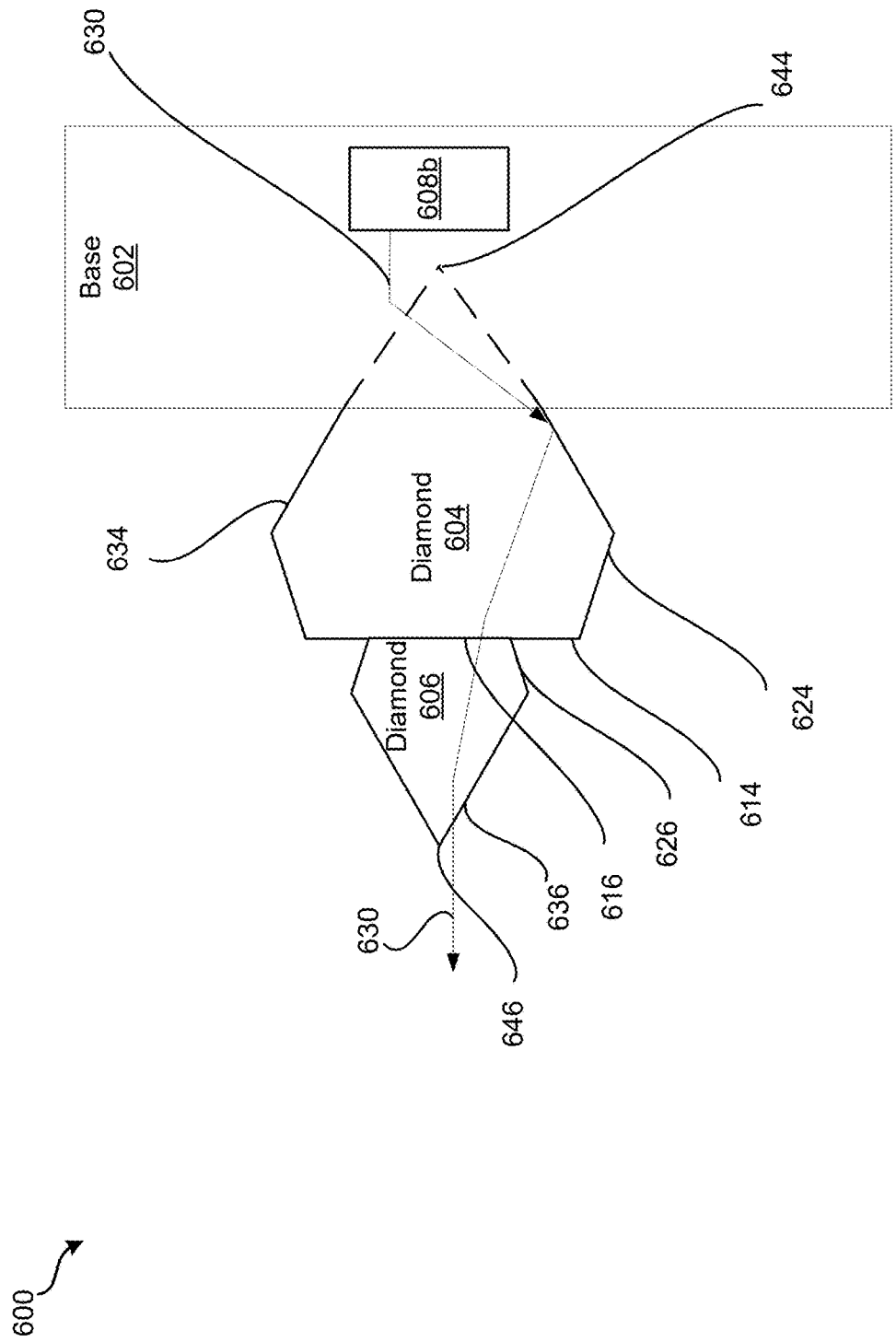
FIG. 6B illustrates the optical device being backlit by an optical element, according to certain embodiments.

FIG. 6B illustrates the optical device 600 being backlit by an optical element 608*b*, according to certain embodiments. As shown in FIG. 6B, the optical element 608*b* may be an emitter (e.g., an LED), configured to direct light 630 into the first diamond 604. The optical element 608*b* may be annular, comprising one or more emitting elements directing the light 630 into one or more of the second lateral surface(s) 634 (e.g., a ring of LEDs). Additionally or alternatively, the optical element 608*b* may direct the light 630 into the vertex 644. In some embodiments, the light 630 may be provided in addition to the ambient light 620 in FIG. 6A. The light 630 may then interfere (either constructively or destructively) with the ambient light 630 to produce a desired image or effect.

The light 630 may enter the first diamond 604 via the second lateral surface(s) 634 and/or the vertex 644. The light 630 may be internally reflected by one or more surfaces of the first diamond 604 (e.g., the first lateral surface(s) 624, second lateral surface(s) 634, etc.). The light 630 may then be redirected into the first diamond 604 via the second lateral surface(s) 626 and exit the first diamond 604 via the first table 614. The light 630 may then enter the second diamond 606 via the second table 616. The light 630 may then be internally reflected by one or more surfaces of the second diamond 606 (e.g., the third lateral(s) 626 and/or the fourth lateral surfaces(s) 636) and exit the second optical body 404 via the second vertex 646 and/or the fourth lateral surfaces(s) 636.

Figure 7:
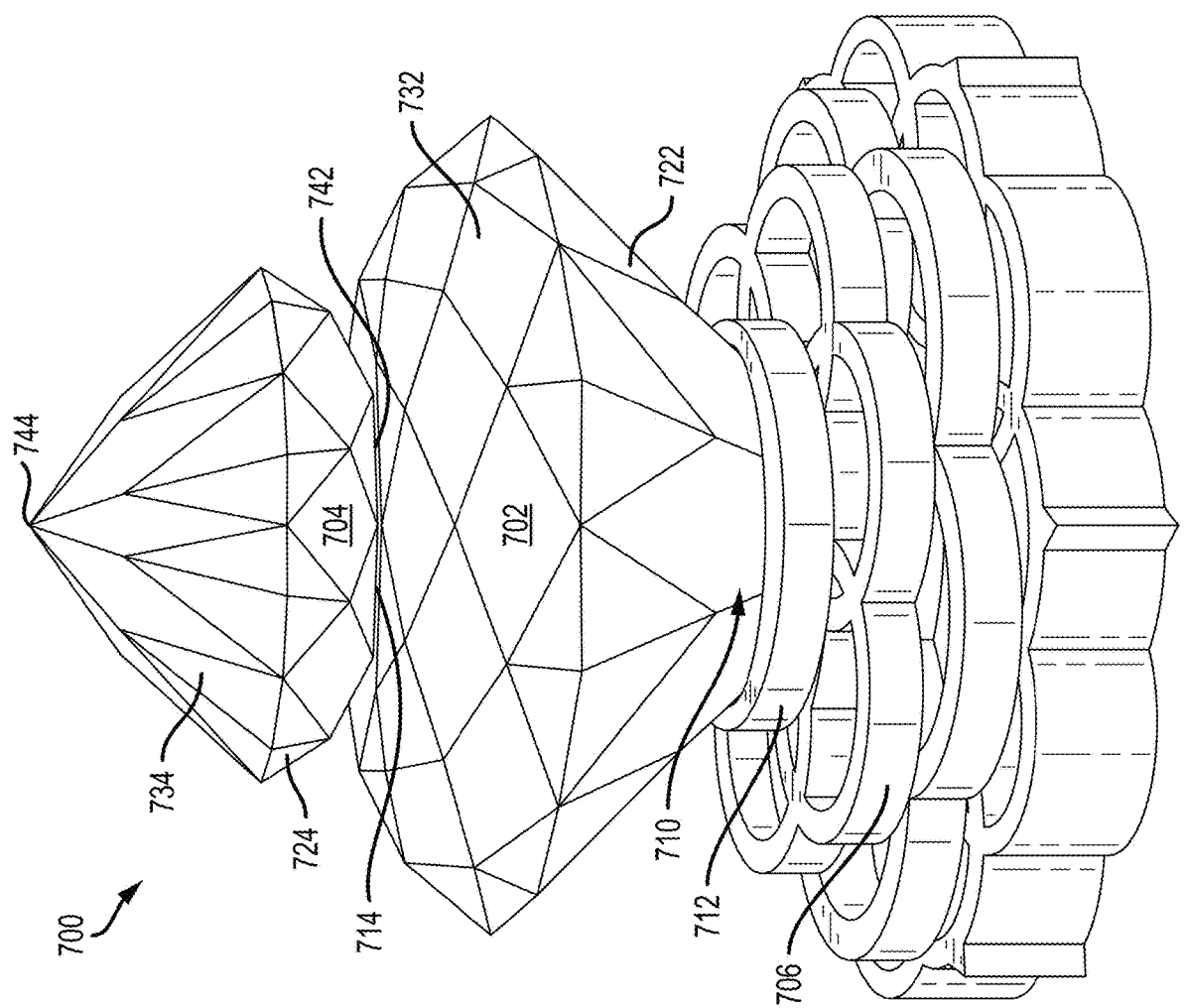
FIG. 7 illustrates an optical device including a first optical body and a second optical body, according to certain embodiments.

FIG. 7 illustrates an optical device 700 including a first optical body 702 and a second optical body 704, according to certain embodiments. The optical device 700 may be a unitary device, where all components are attached. Alternatively, some or all of the components of the optical device 700 may be independent of other components and arranged to form the optical device 700. The optical device 700 may include the first optical body 702, the second optical body 704, and an optical element 706. The first optical body 702 may be similar to the first diamond 202 in FIG. 2. As such, the first optical body 702 may include a base surface 712, a first lateral surface(s) 722, a second lateral surface(s) 432, and a first end 742. Similarly, the second optical body 704 may be similar to the second diamond 204 in FIG. 2, and include a second base surface 714, a third lateral surface(s) 424, a fourth lateral surface(s) 734, and a second end 744.

The optical element 706 may be or may include a base configured to support at least the first optical body 702. The optical element 706 may also include an optical object 710, disposed beneath the first optical body 702. The optical object 710 may include a metal, a stone, a printed image, a light source (e.g., an LED), a mirror, or any other such object. For example, the optical object 710 may be a device configured to reflect light of a certain frequency, providing color (or the appearance thereof) to one or more of the first optical body 702 and the second optical body 704. In another example, the optical object 710 may additionally or alternatively be an object(s) selected to produce a desired image. Light may be reflected or emitted from the optical object 710 such that the image is visible through one or more surfaces of the first optical body 702 and/or the second optical body 704. In yet another example, the optical object 710 may emit light along one or more axes that align with at least a portion of the base surface 712.

In some embodiments the base surface 712 may include a table (e.g., the first table 102 in FIG. 1). Then, the base surface 712 may be physically and optically connected to at least a portion of the optical element 710. In other embodiments, the base surface 712 may include a concave feature. Then, the concave feature of the base surface 712 and the optical element 710 may define a void. The optical object may then be at least partially disposed within the void.

The second table 714 may be configured to receive light from the first optical body 702 via the first end 742. For example, the light from the first optical body 702 may enter the first optical body 702 via the base surface 712. The light may enter the first optical body 702 from an optical device (e.g., an object such as a metal or stone, and/or a light source such as an LED). The light from the optical device may be internally reflected by one or more surfaces of the first optical body 702 (e.g., the first lateral surface(s) 722, second lateral surface(s) 732, etc.) and exit the first optical body 702 via the first end 742. The light may then enter second optical body 704 via the second table 714. The light may then be internally reflected by one or more surfaces of the second optical body 704 (e.g., the third lateral(s) 724 and/or the fourth lateral surfaces(s) 734) and exit the second optical body 704 via the second end 744 and/or the fourth lateral surfaces(s) 734.

In some embodiments, ambient light may enter the first optical body 702 via at least a portion the first end 742 (e.g., a portion of the first end 742 extending beyond the second table 714). The ambient light reflected by one or more surfaces of the first optical body 702 (e.g., the first lateral surface(s) 722, second lateral surface(s) 732, etc.) and exit the first optical body 702 via the first end 742. The ambient light may then enter second optical body 704 via the second table 714. The ambient light may then be internally reflected by one or more surfaces of the second optical body 704 (e.g., the third lateral(s) 724 and/or the fourth lateral surfaces(s) 734) and exit the second optical body 704 via the second end 744 and/or the fourth lateral surfaces(s) 734.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of +20% or +10%, +5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of +20% or +10%, +5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

What is claimed is:

1. An optical device, comprising:
a first optical body manufactured from a first material comprising:
- a first base surface;
- one or more first lateral surfaces, extending from the first base surface at interior angles of less than 180°;
- a first end opposite the first base surface, wherein the first end is narrower than the first base surface; and
- one or more second lateral surfaces that extend between and couple the one or more first lateral surfaces and the first end, wherein a junction between the one or more first lateral surfaces and the one or more second lateral surfaces defines a largest lateral dimension of the first optical body; and a second optical body manufactured from a second material, and coupled to the first optical body, the second optical body comprising:
- a second base surface;
- one or more third lateral surfaces extending from the second base surface at interior angles of less than 180°;
- a second end, opposite the second base surface, wherein the second end is narrower than the second base surface; and
- one or more fourth lateral surfaces that extend between and couple the one or more third lateral surfaces and the second end, wherein:
  - a junction between the one or more third lateral surfaces and the one or more fourth lateral surfaces defines a largest lateral dimension of the second optical body; and
  - the first base surface and the second base surface are coupled with one another.

2. The optical device of claim 1, wherein the first end comprises a first table, and the second base surface comprises a second table.

3. The optical device of claim 2, wherein the first end of the first optical body and the second base surface of the second optical body are affixed using an optical adhesive.

4. The optical device of claim 1, wherein the first base surface comprises a concave feature.

5. The optical device of claim 4, wherein an optical element is in contact with the concave feature of the first base surface, and a void is defined between the concave feature and the optical element, where the void is filled with at least one of air, nitrogen, or water.

6. The optical device of claim 1, wherein the first material comprises a first refractive index, and the second material comprises a second refractive index different than the first refractive index.

7. The optical device of claim 1, wherein at least one of the first optical body and the second optical body is a triamond.

8. The optical device of claim 1, wherein at least one of the first material and the second material comprises a crystalline material.

9. The optical device of claim 1, wherein at least one of the first material and the second material is colorless.

10. The optical device of claim 1, wherein:
- the first base surface comprises a first table;
- the second base surface comprises a second table;
- at least one of the first end and the second end comprises a point; and
- the first table of the first optical body is coupled to the second table such that the first end and the second end are oriented in opposite directions.

* * * * *